Oct. 5, 1948.   J. B. ROBINS   2,450,690
TRUCK FOR HANDLING ELECTRIC
REFRIGERATORS AND THE LIKE
Filed Dec. 17, 1946
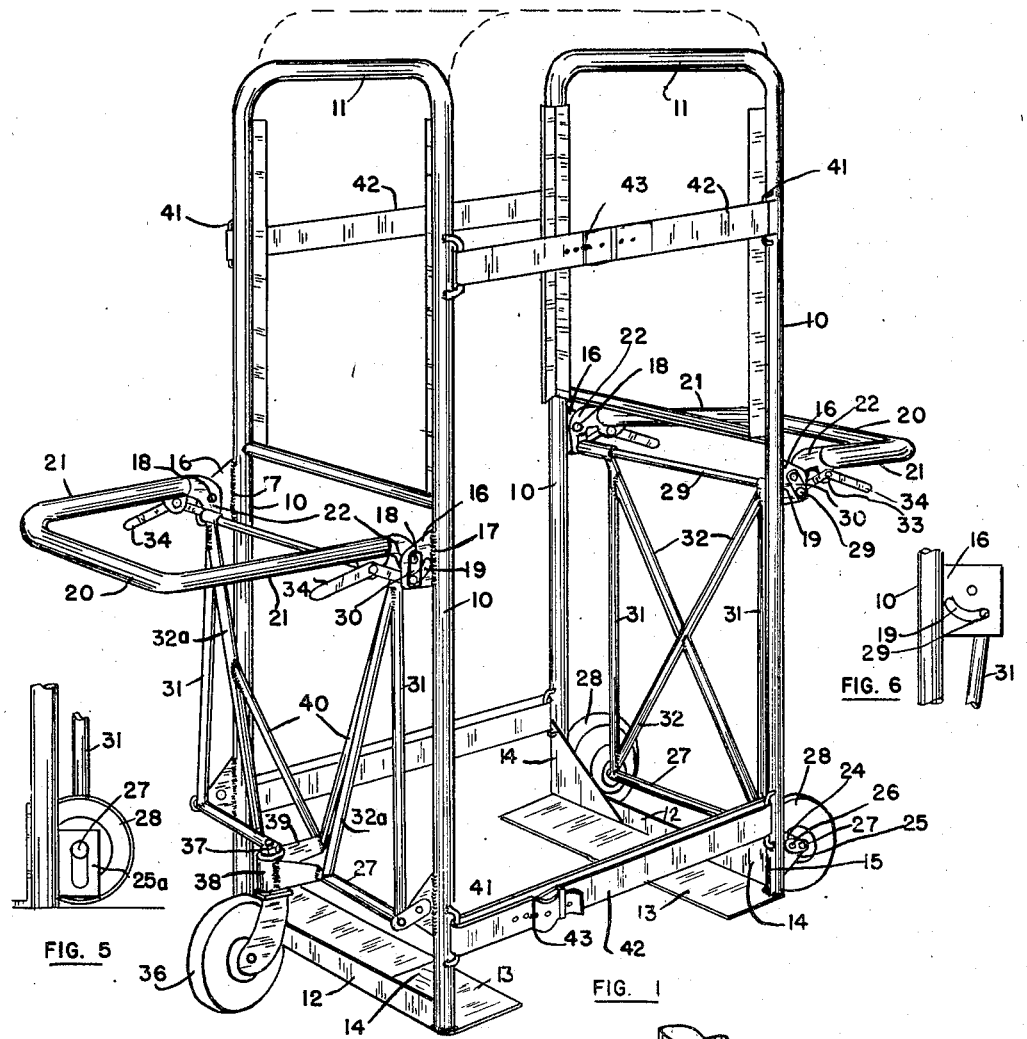
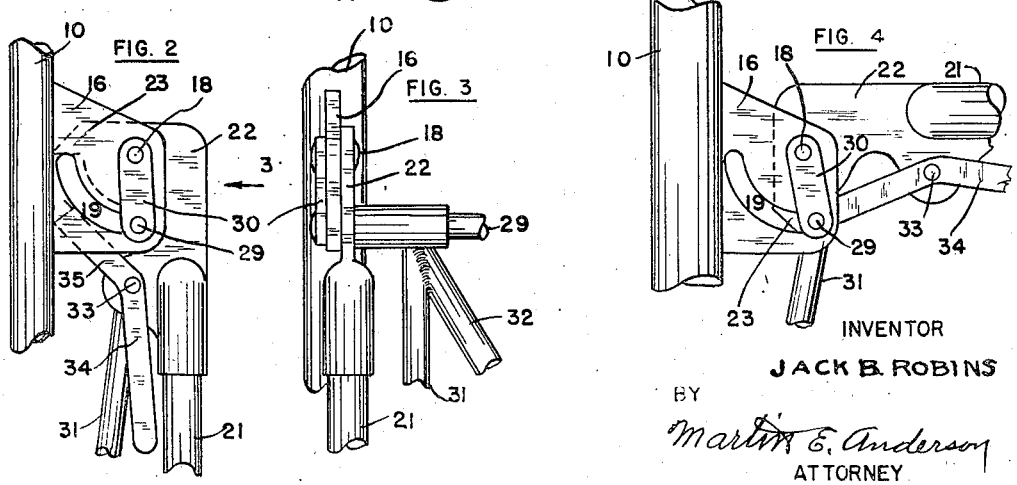
INVENTOR
JACK B. ROBINS
BY
Martin E. Anderson
ATTORNEY Patented Oct. 5, 1948

2,450,690

UNITED STATES PATENT OFFICE 2,450,690

TRUCK FOR HANDLING ELECTRIC REFRIGERATORS AND THE LIKE

Jack B. Robins, Colorado Springs, Colo., assignor to Aircraft Mechanics Inc., Colorado Springs, Colo., a corporation of Colorado Application December 17, 1946, Serial No. 716,725

3 Claims. (Cl. 280—44)

This invention relates to improvements in trucks of the type used in warehouses and stores and has reference more particularly to a truck designed with special reference to the handling of electric refrigerators and other similar articles such as boxes or cases of a corresponding size.

In stores and warehouses where electric refrigerators are sold and stored, it is frequently necessary to change their locations and to transport them from the store to a loading platform and onto a truck, after they have been sold.

Automatic refrigerators, whether electric or the gas operated type, are quite massive and heavy and unless some special trucks are provided for handling them, it requires the combined efforts of several men to move, load and unload them.

It is the object of this invention to produce a truck which has been designed with special reference to the handling of refrigerators as above, but which is equally applicable to the handling of many other articles, which shall be of a simple and substantial construction and of such design that it may be readily positioned in operative engagement with the article to be handled.

In order to simplify the description, the article with which the truck is to be employed will, hereinafter, be referred to as "electric refrigerators," it being understood, however, that the application is not limited in any way to the handling of this specific article.

It is a further object of this invention to produce a truck that shall be provided with wheels so connected therewith that the wheels may be moved to inoperative position during the loading and unloading of the refrigerator and which can be readily moved into floor engagement or operative position by means of a handle.

It is a further object of this invention to produce a wheel control mechanism of such construction that the handle by means of which the wheels are moved from inoperative position to operative position will automatically release itself from the wheel operating member so that the handle may be used in moving and controlling the loaded truck.

A further object of the invention is to produce a truck comprising two substantially identical units of such design that they can be connected each with one of the opposite sides of a refrigerator and strapped into position by means of suitable straps or other tension elements.

Another object of the invention is to produce a truck of the class described in which the wheel operating mechanism, after the wheels have been brought into engagement with the supporting surface, will remain in what may be termed an "overset" position so as to prevent accidental return movement of the wheels until the operator employs for that purpose the handle and releasing mechanism.

The above and other objects that may become apparent as this description proceeds are attained by means of a construction and an arrangement of parts that will now be described in detail, and for this purpose reference will be had to the accompanying drawing in which the invention has been illustrated, and in which:

Figure 1 is a perspective view showing the two parts of the truck in operative relation, the position of the electric refrigerator has been indicated by broken lines;

Figure 2 is a side elevation to a somewhat enlarged scale, of the handle hinge and wheel controlling mechanism;

Figure 3 is a view looking in the direction of arrow 3, in Figure 2;

Figure 4 is a view showing the position of the handle and associate parts at the beginning of the wheel releasing movement; and Figures 5 and 6 show a slightly modified construction.

The truck which forms the subject of this invention is formed from two separate elements of such construction that they cooperate to accomplish the function for which the invention is intended. The two truck elements will now be described.

The truck element to the right in Figure 1 consists of an elongated pipe frame having two spaced parallel vertical members 10 connected at their upper ends by means of a transverse top member 11. At their lower ends members 10 are connected by means of a flat bar 12 that may be integral with the bottom plate 13, if desired, but which may also be formed from an independent element. Triangular plates 14 have their vertical edges welded to the side members 10 as indicated at 15 and may be either welded or secured to bar 12 so as to form a rigid brace for the truck frame and so as to secure plate 13 firmly in position. The opposite truck element has a frame substantially identical with the one described and the corresponding elements thereof have been designated by the same reference numerals. Outwardly extending plates 16 are welded to the vertical frame members 10 as shown at 17 and are each provided with an opening for the reception of a pivot 18 and with an arcuate slot 19 that is concentric with pivot 18. A handle formed from a pipe bent into a substantially U-shape has a hand grip portion 20 and ends 21 provided with flattened members 22 that have openings for the reception of pivots 18. The construction that has just been described is better shown in Figures 2, 3 and 4 to which reference may be had.

Flattened end members 22 are provided with laterally extending hooks 23 that project across the arcuate slot 19. This member has been shown by broken lines in Figure 2 and partly by full lines in Figure 4. When the handle is moved upwardly these hooks will move downwardly along the arcuate slot for a purpose which will presently be explained.

Referring now to Figure 1 and to the truck element to the right thereof, it will be observed that each of the side frame members 10 are provided near their lower ends with an outwardly extending plate 24 to which a link 25 is connected by means of a pivot 26. Axle 27 carries at each end a rubber tired wheel 28 and the ends of axle 27 terminate in openings in links 25. Rod 29 extends through slots 19 and through openings in the ends of links 30. Vertical parallel rods 31 connect rod 29 with shaft 27 as shown in Figure 1 and the rectangle thus formed is made rigid by means of diagonal braces 32. Secured to each flattened end member by means of pivots 33 are handles 34, whose ends 35, above the pivot, are inclined in the manner shown in Figure 2. After the links 30 have been moved into the position shown in Figure 2 in which position the wheels have moved downwardly a corresponding distance and raised the truck frame from the floor surface, members 31 and link 30 form an overset toggle that automatically holds the wheels in operative position until they are released. Handle 20 may now be moved upwardly or downwardly through a considerable angle, the upward movement being limited by hooks 23 engaging rod 29. The downward movement is not limited unless the operator manipulates handle 34 to bring it into the position shown in Figure 4 in which position the end 35 abuts the rod 29 and on a downward movement of handle 20, the toggle is broken and the truck frame is permitted to descend towards the position shown in Figure 1. The rate at which the downward movement takes place can be controlled because hooks 23 control the movement of bar 29.

The truck on the left side in Figure 1 is constructed in substantially the same manner, but instead of having two wheels 28, it has a single caster wheel 36 that is mounted to turn about the vertical pivot 37. Pivot 37 turns in a bearing 38 that extends forwardly of and is connected with bar 27. Bearing 38 is also provided with a rearwardly extending portion 39. Instead of the diagonal braces 32 shown in the right hand truck, the wheel controlling frame for the truck at the left has inclined brace members 32a from which other brace members 40 extend to the rear end of bearing portion 39. This gives a substantial bracing effect and keeps the pivot 37 in vertical position at all times. The vertical movement of caster wheel 36 is controlled by handle 20 in the same manner as that explained in connection with wheels 28. The vertical frame members 10 are provided with loops 41 near their tops and bottoms and these are connected by straps 42 that have buckles 43.

When a heavy object, like an electric refrigerator, is to be moved, the two sections are disconnected by disconnecting the straps 42. One of the sections is then brought up into closed contact with the refrigerator and the latter is tilted sufficiently to permit plate 13 to enter between the bottom thereof and the floor after which the refrigerator is released. The other truck section is then brought up against the opposite side and the refrigerator tilted slightly so as to permit plate 13 to enter underneath. The two truck sections are then interconnected by means of straps 42 and with their load moved upwardly relative to wheels 28 and 36 into load supporting position by the means and in the manner above described, which raises plates 13 from the floor, the operator can now move the refrigerator very easily, either by pulling one or pushing on one of the handles 20. If any lifting is required, the force can be exerted on the handles because they are limited in their upward movement by hooks 23, engaging bars 29. The refrigerator can be retained in the truck during transportation from the store to the purchaser's place and by simply releasing the wheels the truck and refrigerator will be supported solidly from the truck floor. The wheels can readily be moved into supporting position in the manner described and the refrigerator removed by running it down over a plank incline. The truck with its load can then be moved over the side walk and over floors until it reaches its proper position, whereupon the straps 42 are disconnected and the truck sections removed.

Particular attention is directed to the construction of the handles and the mechanism by means of which the wheels are brought into load supporting position and held in that position by the offset toggle and from which position they can be released by means of handles 20 and 34.

Figures 5 and 6 show a construction in which links 25 and 30 have been dispensed with. Since slot 19 is curved about the center of pivot pin 29 it will follow the same path whether link 30 is present or not. Since links 25 merely function as guides and since the essential thing is to move the load upwardly relative to wheels 28 elongated guide slots 25a can take the place of links 25.

Having described the invention, what is claimed as new is:

1. A truck comprising an elongated frame closed at the top and open at the bottom, a load supporting plate connecting the lower ends and projecting laterally therefrom, an axle positioned near the bottom of the frame, at least one wheel carried by the axle, means connecting the axle with the frame to permit it to move a limited distance in the direction of the frame, a handle pivoted to the frame at a point above the axle, a pusher frame connected at its lower end with the axle, the upper end of the pusher frame having a transverse bar, means constraining the bar to move in an arcuate path substantially concentric with the pivot handle, means comprising a portion of the handle for moving the bar in a downward direction, means for holding the bar in its lowermost position, and means comprising a lever pivoted to the handle for engaging the bar to move it from its lowermost to a higher position.

2. A truck for transporting electric refrigerators and the like, comprising two vertically elongated frames, supporting plates projecting laterally from the lower ends of the frames, one of the frames having a transverse axle connected therewith for limited movement in a vertical direction, two spaced wheels carried by the axle for rotation about its axis, a handle of substantially U-shape having the ends of its sides pivotally connected with the frame, means for raising the frame by moving the supporting wheels downwardly relative thereto by an upward rotation of the handle about its pivots, means for latching the frame in elevated position, means on the handle for releasing the latch by a downward rotation of the handle, means for interconnecting the two frames, one on each side of a refrigerator, and a caster wheel on the other frame, adapted to extend below the supporting plate, whereby the refrigerator will be supported by said wheels for transportation.

3. A truck for transporting refrigerators and the like, comprising an elongated frame having two upwardly ranging frame members connected at their upper ends, a forwardly projecting supporting plate attached to the lower ends of the frame, an axle extending transversely of the frame near its lower end, means for attaching the axle to the frame to permit it to move a limited distance in the direction of the length of the frame, each frame member having a rearwardly extending plate attached thereto at a point above the axle, the plates having each an opening for the reception of a pivot, and an arcuate slot concentric with the opening, a handle of substantial U-shape having the ends of its sides flattened and connected with the rearwardly extending plates by pivots, each flattened end of the handle having a hook portion extending across the arcuate slot, a bar having its ends projecting through the arcuate openings, a link connecting each end of the bar with the adjacent pivot, a pusher frame connecting the bar with the axle, the hooks at the ends of the handle engaging the bar when the handle is rotated upwardly about its pivots, the pusher frame and links being positioned to form an overset toggle when the handle is in vertical position, and means comprising a lever pivoted to each side arm of the handle for engaging the bar to move the toggle to underset position, the hooks and handles serving as means to control the rate of downward movement of the frame.

JACK B. ROBINS.

REFERENCES CITED

The following references are of record in the file of this patent:

UNITED STATES PATENTS

| Number | Name | Date |
|---|---|---|
| 2,008,887 | Venables | July 23, 1935 |
| 2,258,819 | Sohn | Oct. 14, 1941 |